(12) United States Patent
Fan et al.

(10) Patent No.: US 10,786,117 B2
(45) Date of Patent: Sep. 29, 2020

(54) FOOD PROCESSOR

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Qian Fan, Foshan (CN); Xianghe Zeng, Foshan (CN); Jianfei Xu, Foshan (CN)

(73) Assignees: GUANGDONG MIDEA CONSUMER ELECTRICS MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 16/259,971

(22) Filed: Jan. 28, 2019

(65) Prior Publication Data
US 2019/0150670 A1   May 23, 2019

Related U.S. Application Data

(63) Continuation of application No. PCT/CN2016/107801, filed on Nov. 29, 2016.

(30) Foreign Application Priority Data

Oct. 28, 2016   (CN) .......................... 2016 1 0968428
Oct. 28, 2016   (CN) .......................... 2016 1 0971493
(Continued)

(51) Int. Cl.
*A47J 43/00* (2006.01)
*A47J 43/046* (2006.01)
(Continued)

(52) U.S. Cl.
CPC .......... *A47J 43/046* (2013.01); *A47J 43/0722* (2013.01); *A47J 43/0727* (2013.01); *A47J 43/085* (2013.01)

(58) Field of Classification Search
CPC .. A47J 43/046; A47J 43/0722; A47J 43/0727; A47J 43/085
See application file for complete search history.

(56) References Cited

U.S. PATENT DOCUMENTS 6,092,922 A    7/2000  Kett et al.
7,267,478 B2   9/2007  Miller et al.
(Continued)

FOREIGN PATENT DOCUMENTS

AU    2006289653 A1    4/2008
CN       2817665 Y     9/2006
(Continued)

OTHER PUBLICATIONS

Guangdong Midea Consumer Electrics Manufacturing Co., Ltd., Office Action, CN201610971493.2, dated Oct. 23, 2019, 5 pgs.
(Continued)

*Primary Examiner* — Anshu Bhatia
(74) *Attorney, Agent, or Firm* — Morgan, Lewis & Bockius LLP

(57) ABSTRACT

The present disclosure provides a food processor including a cutter head, on which a cutter is arranged; and a cup body arranged on the cutter head. The intersecting line of the side wall of the cutter head and the cross section of the cutter head is a cutter head contour line, the largest inscribed circle or the smallest circumscribed circle of the cutter head contour line is a cutter head base circle, and the central axis of the cutter head penetrates the center of the cutter head base circle. The intersecting line of the cup wall of the cup body and the cross section of the cup wall is a cup body
(Continued)

contour line, the largest inscribed circle or the smallest circumscribed circle of the cup body contour line is a cup body base circle, and the central axis of the cup body penetrates the center of the cup body base circle.

20 Claims, 10 Drawing Sheets

(30) Foreign Application Priority Data

Oct. 28, 2016 (CN) .................... 2016 2 1186043 U
Oct. 28, 2016 (CN) .................... 2016 2 1195265 U

(51) Int. Cl.
*A47J 43/07* (2006.01)
*A47J 43/08* (2006.01)

(56) References Cited

U.S. PATENT DOCUMENTS

| | | | |
|---|---|---|---|
| 8,529,120 B2* | 9/2013 | Ulanski | A47J 43/0727 366/314 |
| 8,550,695 B2* | 10/2013 | Conti | A47J 43/0727 366/205 |
| 2006/0176768 A1 | 8/2006 | Williams et al. | |
| 2009/0114616 A1 | 5/2009 | White et al. | |
| 2014/0263784 A1* | 9/2014 | Nernberger | B01F 15/00876 241/100 |
| 2015/0282673 A1 | 11/2015 | Palmer et al. | |

FOREIGN PATENT DOCUMENTS

| | | |
|---|---|---|
| CN | 201905766 U | 7/2011 |
| CN | 102670092 A | 9/2012 |
| CN | 103251331 A | 8/2013 |
| CN | 203987646 U | 12/2014 |
| CN | 104257295 A | 1/2015 |
| CN | 104334065 A | 2/2015 |
| CN | 104812280 A | 7/2015 |
| CN | 204839230 U | 12/2015 |
| CN | 204889746 U | 12/2015 |
| CN | 206565826 U | 10/2017 |
| CN | 206565828 U | 10/2017 |
| CN | 108013789 A | 5/2018 |
| CN | 108013792 A | 5/2018 |
| EP | 2486833 A1 | 8/2012 |
| EP | 2735252 A1 | 5/2014 |
| JP | 1993253084 A | 9/1994 |
| JP | 2002102080 A | 4/2002 |
| WO | WO03001954 A1 | 1/2003 |
| WO | WO2009106710 A2 | 9/2009 |

OTHER PUBLICATIONS

Guangdong Midea Consumer Electrics Manufacturing Co., Ltd., Office Action, CN201610968428.4, dated Oct. 23, 2019, 5 pgs.
Guangdong Midea Consumer Electrics Manufacturing Co., Ltd., 2nd Search of CN201610968428.4, dated Oct. 15, 2019, 2 pgs.
Guangdong Midea Consumer Electrics Manufacturing Co., Ltd., International Search Report, PCT/CN2016/107801, dated Aug. 2, 2017, 5 pgs.
Guangdong Midea Consumer Electrics Manufacturing Co., Ltd., Office Action, CN201610971493.2, dated Mar. 11, 2019, 5 pgs.
Guangdong Midea Consumer Electrics Manufacturing Co., Ltd., First Search of CN201610971493.2, dated Feb. 22, 2019, 3 pgs.
Guangdong Midea Consumer Electrics Manufacturing Co., Ltd., Office Action, CN201610968428.4, dated Feb. 22, 2019, 5 pgs.
Guangdong Midea Consumer Electrics Manufacturing Co., Ltd., First Search of CN201610968428.4, dated Feb. 22, 2019, 3 pgs.
Guangdong Midea Consumer Electrics Manufacturing Co., Ltd., Office Action, TW106135314, dated Mar. 9, 2019, 12 pgs.
Guangdong Midea Consumer Electrics Manufacturing Co., Ltd., First Office Action, CN2019515653, dated Apr. 7, 2020, 5 pgs.
Guangdong Midea Consumer Electrics Manufacturing Co. Ltd., Midea Group Co. Ltd., Requisition by the Examiner, CA3035998, dated Feb. 19, 2020, 6 pgs.

* cited by examiner

FOOD PROCESSOR

CROSS-REFERENCE TO RELATED APPLICATIONS

This application is a continuation application of PCT/CN2016/107801, entitled "FOOD PROCESSOR" filed on Nov. 29, 2016, which claims priority to: (i) Chinese Patent Application No. 201610968428.4, entitled "FOOD PROCESSOR" filed with the State Intellectual Property Office of P. R. China on Oct. 28, 2016, (ii) Chinese Patent Application No. 201610971493.2, entitled "FOOD PROCESSOR" filed with the State Intellectual Property Office of P. R. China on Oct. 28, 2016, (iii) Chinese Patent Application No. 201621186043.4, entitled "FOOD PROCESSOR" filed with the State Intellectual Property Office of P. R. China on Oct. 28, 2016, and (iv) Chinese Patent Application No. 201621195265.2, entitled "FOOD PROCESSOR" filed with the State Intellectual Property Office of P. R. China on Oct. 28, 2016, the entire contents of which is incorporated herein by reference.

This application is related to U.S. patent application Ser. No. 16/259,966, entitled "FOOD PROCESSOR" filed on Jan. 28, 2019.

TECHNICAL FIELD

The present disclosure relates to the field of household electric apparatuses, and specifically relates to a food processor.

BACKGROUND

The existing stirring system is often regular in shape, the central axes of a cutter head, a cutter and a cup body are collinear, while the contours of the cutter head and the cup body are also regular in shape, so the turbulent effect and the stirring performance are poor.

SUMMARY

In order to solve at least one of the said aforementioned technical problems, an embodiment in one aspect of the present disclosure provides a food processor.

In view of this, according to the embodiment in one aspect of the present disclosure, the present disclosure provides a food processor, including: a cutter head, wherein a cutter is arranged on the cutter head, the intersecting line of the side wall of the cutter head and the cross section of the cutter head is a cutter head contour line, the largest inscribed circle or the smallest circumscribed circle of the cutter head contour line is a cutter head base circle, and the central axis of the cutter head passes through the center of the cutter head base circle; and a cup body, wherein the cup body is located above the cutter head and arranged on the cutter head, the intersecting line of the cup wall of the cup body and the cross section of the cup wall is the cup body contour line, the largest inscribed circle or the smallest circumscribed circle of the cup body contour line is a cup body base circle, and the central axis of the cup body passes through the center of the cup body base circle; wherein the distances between any one of different points on the same cup body contour line and the center of the cup body base circle are unequal; and the distances between any one of different points on the same cutter head contour line and the center of the cutter head base circle are either equal or unequal.

According to the food processor provided by the present disclosure, on the one hand, the distances between any one of different points on the same cup body contour line and the center of the cup body base circle are unequal, and the distances between any one of different points on the same cutter head contour line and the center of the disc base circle are equal, i.e., the cup body contour line is eccentric, but the cutter head contour line is not eccentric. Through adopting the eccentric cup body contour technology for stirring food, it can improve the whirl effect of stirring. This can make the turbulence speed of food in the cup body diversified; meanwhile, this helps the cutter shatter food better, which improves the stirring performance, making the food taste great and thereby improves the user experience. On the other hand, the distances between any one of different points on the same cup body contour line and the center of the cup body base circle are unequal, i.e., the cup body contour line is eccentric; and the distances between different points on the same cutter head contour line and the center of the said cutter head base circle are unequal, i.e., the cutter head contour line is also eccentric. That is, the cup body contour is eccentric, and the cutter contour is also eccentric. Through adopting this eccentric technology to conduct food stirring, the whirl effect of stirring can be improved. Meanwhile, this eccentric technology helps the cutter shatter food better, which improves the stirring performance, while making the food taste great and thereby improves the user experience. Furthermore, the relative positions of the central axis of the cup body, the central axis of the cutter head and the axis of the cutter are adjusted to realize mutual eccentricity, and thus, the turbulence effect and the stirring performance are further improved via the eccentric technology. Furthermore, the cup body of the food processor is provided with an upper opening and a lower opening, and the cross section area of the cup body gradually shrinks from top to bottom, i.e., the whole cup body has a certain taper. Moreover, the cross section area of the upper end is greater than that of the lower end, so that on the one hand, this helps the cutter shatter food better, while on the other hand, this is beneficial to turbulence for the cup body having a certain taper. Thus, the turbulence effect and crushing effect of food are further improved, and the taste of food is improved.

In addition, the food processor provided by the present disclosure in the above embodiment may further have the following technical features, In the above technical solution, preferably, the central axis of the cutter head coincides with that of the cup body.

In this technical solution, the central axes of the cutter head coincides with that of the cup body, which makes the cutter head contour non-eccentric, the cup body contour eccentric. Adopting the eccentric structure for stirring food can improve the whirling effect of stirring. Meanwhile, this structure helps the cutter shatter food better, which improves the stirring performance, making the food taste great and thereby improves the user experience. Furthermore, by changing the relative positions of the axis of the cutter, the central axis of the cutter head and the central axis of the cup body, the turbulence effect is improved, and the stirring performance is promoted.

In the above technical solution, preferably, the central axis of the cutter head and the axis of the cutter coincide with the central axis of the cup body.

In this technical solution, the central axis of the cutter head and the axis of the cutter coincides with the central axis of the cup body, i.e., the cup body, the cutter head and the cutter are on the same central axis, thus forming an eccentric structure in which the cup body contour is eccentric, but the cutter head contour is non-eccentric, and the axis of the cutter is coaxial with the axis of the cup body and the cutter head. Adopting such an eccentric structure for stirring food can improve the whirl effect of stirring. Meanwhile, this structure helps the cutter shatter food better, which improves the stirring performance, making the food taste great and thereby improves the user experience.

In the above technical solution, preferably, the central axis of the cutter head coincides with that of the cup body, and has an eccentric distance L1 from the axis of the cutter.

In this technical solution, the central axis of the cutter head coincides with that of the cup body, and has an eccentric distance L1 from the axis of the cutter, i.e., based on the eccentric cup body contour, the axis of the cutter is eccentric relative to the central axis of the cup body and the central axis of the cutter head. By adopting the structure in which the cutter is relatively eccentric and the cup body contour is eccentric, the whirl effect of stirring is improved. Meanwhile, this structure helps the cutter shatter food better, which improves the stirring performance, making the food taste great and thereby improves the user experience.

In the above technical solution, preferably, the central axis of the cutter head does not coincide with that of the cup body.

In this technical solution, the central axis of the cutter head does not coincide with that of the cup body, i.e., the axis are relatively eccentric, meanwhile, the cup body contour is eccentric, so that the food processor adopting this eccentric structure for stirring food can improve the whirl effect of stirring. Meanwhile, this structure helps the cutter shatter food better, which improves the stirring performance, making the food taste great and thereby improves the user experience.

In the above technical solution, preferably, the central axis of the cutter head and the axis of the cutter are coincided, and have an eccentric distance L2 from the central axis of the cup body.

In this technical solution, the cup body contour is eccentric. Meanwhile, the central axis of the cup body has an eccentric distance L2 relative to the central axis of the cutter head and the axis of the cutter. Through the cup body adopting such an eccentric structure for stirring food, the whirl effect of stirring can be improved. Meanwhile, this structure helps the cutter shatter food better, which improves the stirring performance, making the food taste great and thereby improves the user experience.

In the above technical solution, preferably, the central axis of the cup body coincides with the axis of the cutter, and has an eccentric distance L3 away from the central axis of the cutter head.

In this technical solution, the central axis of the cup body coincides with the axis of the cutter, and has an eccentric distance L3 away from the central axis of the cutter head, i.e., the cup body contour is eccentric, and the cup body is coaxial with the cutter and has an eccentric distance L3 away from the axis of the cutter head. By adopting this eccentric structure, the whirl effect of stirring is improved. Meanwhile, this structure helps the cutter shatter food better, which improves the stirring performance, making the food taste great and thereby improves the user experience.

In the above technical solution, preferably, the central axis of the cup body and the central axis of the cutter head have an eccentric distance L4; the central axis of the cutter head and the axis of the cutter have an eccentric distance L5; and the central axis of the cup body and the axis of the cutter have an eccentric distance L6.

In this technical solution, the central axis of the cup body, the central axis of the cutter head and the axis of the cutter all have eccentric distances. By adopting this eccentric structure, the whirl effect of stirring is further improved. Meanwhile, this structure helps the cutter shatter food better, which improves the stirring performance, making the food taste great and thereby improves the user experience. When the central axis of the cup body, the central axis of the cutter and the central axis of the cutter head are nonlinear or unparallel, the distance between each of central axes refers to the distance between each of central axes and the intersecting point on any of the same cross sections.

In the above technical solution, preferably, further comprising a contour eccentric distance, which is an absolute value of the distance between the center of the base circle and the different points on the contour line subtracted by the radius of the base circle; wherein the contour eccentric distance of the cup body L7 is an absolute value of a value obtained by subtracting the radius of the base circle of the cup body from the distance between different points on the contour lines of the cup body and the center of the base circle of cup body, and the contour eccentric distance of the cutter head L8 is an absolute value of a value obtained by subtracting the radius of the base circle of the cutter head from the distance between different points on the contour lines of the cutter head and the center of the base circle of the cutter head.

In this technical solution, on the one hand, the cutter head contour is not eccentric, and the contour eccentric distance of the cup body is L7; and on the other hand, the contour eccentric distance of the cup body is L7, and the contour eccentric distance of the cutter head is L8. Through applying the eccentric structure, the turbulence effect is improved, which then improves the stirring performance.

In the above technical solution, preferably, the eccentric distance L1 is more than or equal to 0 mm and less than or equal to 50 mm.

In the above technical solution, preferably, the eccentric distance L2 is more than or equal to 0 mm and less than or equal to 50 mm.

In the above technical solution, preferably, the eccentric distance L3 is more than or equal to 0 mm and less than or equal to 50 mm.

In the above technical solution, preferably, the eccentric distance L1, the eccentric distance L2, the eccentric distance L3, the eccentric distance L4, the eccentric distance L5 and the eccentric distance L6 are respectively more than or equal to 0 mm and less than or equal to 50 mm.

In the above technical solution, preferably, the contour eccentric distance L7 of the cup body and the contour eccentric distance L8 of the cutter head are respectively more than or equal to 0 mm and less than or equal to 100 mm.

In this technical solution, by setting reasonable eccentric distances, the optimal turbulence effect is realized, and the stirring performance is improved.

In the above technical solution, preferably, the cutter head and the cup body are of an integrated structure or a split structure.

In this technical solution, on the one hand, the cutter head and the cup body are of an integrated structure, so that the stability is good. Furthermore, this structure makes installation convenient, and improves the production efficiency, wherein the eccentric contour may be a certain part of a component; and on the other hand, the cutter head and the cup body are of a split structure, which makes disassembly and maintenance easy. Also, in order to ensure the leak tightness of the cutter head and the cup body, preferably, a sealing ring is arranged between the cutter head and the cup body.

In the above technical solution, preferably, the cross section of the cup body is a dome and/or the cross section of the cutter head is a dome.

In this technical solution, on the one hand, the cross section of the cup body is a dome; and on the other hand, the cross sections of both the cup body and the cutter head are domes, and the eccentricity is formed via irregular curves, so that the turbulence effect of the cup body is improved. Meanwhile, this helps the cutter shatter food better and thereby improves the stirring performance. Furthermore, the dome is an ellipse, the cross section of the cup body is an ellipse, and the cup body with such a structure is easy to process. Meanwhile, the central axis of the cutter head, the central axis of the cutter and the central axis of the cup body are each respectively distributed at two axis of the ellipse to form eccentricity. Thus, the structure is simple, and it is easy to operate. Furthermore, the turbulence effect of the cup body is further improved; this structure helps the cutter shatter food better, and also improves the stirring performance.

In the above technical solution, preferably, the cup wall includes an outer wall and an inner wall of the cup body; and the contour line of the cup body is an intersecting line of the outer wall of the cup body and the cross section of the outer wall of the cup body, or the contour line of the cup body is an intersecting line of the inner wall of the cup body and the cross section of the inner wall of the cup body.

In this technical solution, the contour line of the cup body can be an intersecting line of the outer wall of the cup body and the cross section of the cup wall, or an intersecting line of the inner wall of the cup body and the cross section of the cup wall. The contour line may be obtained through multiple ways, and the distances between different points on the same contour line and the center of the base circle of the cutter head are unequal, so that an eccentric structure is formed, then the whirl effect is improved, and the stirring performance is promoted.

In any of above technical solutions, preferably, the cutter includes at least two groups of blades, each group of blades includes at least two blades; wherein the blades of one group of blades extend downward obliquely, and the blades of the other group of blades extend upward obliquely; or the blades of one group of blades extend horizontally, and the blades of the other group of blades extend upward or downward obliquely.

In this technical solution, multiple groups of blades are provided, and the extending angle of each group of blades is different, so that the turbulence effect of the cup body is further improved, the contact area of the cutter and food is increased and repeated shattering of food is realized. Thus, the food is shattered more thoroughly, the taste of the food is promoted, and the satisfaction of a user is improved.

In the above technical solution, preferably, the cutter includes two groups of blades, which are respectively a first group of blades and a second group of blades, and each group of blades is composed of two blades; the blade of the first group of blades includes an oblique part and a horizontal part, the oblique part is close to the central axis of the cutter head, and the horizontal part is away from the central axis of the cutter head; wherein the blades of the first group of blades extend downward obliquely and are arranged below the second group of blades, and the blades of the second group of blades extend upward obliquely.

In this technical solution, two groups of blades are provided, wherein the first group of blades is arranged above the second group of blades, the blades of the first group of blades extend downward, while the blades of the second group of blades extend upward, i.e., the extending directions are opposite; through setting the blades on the upper two sides, the contact area of the cutter and food is sufficiently increased, and the shattering efficiency is improved; and the extending directions of the blades are opposite, so that the turbulence effect and the shattering effect on different heights are further improved, the overall food shattering efficiency is improved, the shattering effect is also improved. Furthermore, the taste of food and the user experience are also promoted.

In the above technical solution, preferably, the first group of blades and the second group of blades are of an integrated structure.

In this technical solution, the two groups of blades are of an integrated structure, so that the overall strength of the cutter is improved, the service reliability of the cutter is guaranteed, and the service life of the cutter is prolonged; and being an integrated cutter, this makes it easier for maintenance and installation, and improves the production efficiency.

In any of the above technical solutions, turbulence ribs are arranged in the cup body, a cup lid is arranged on the cup body, the cup lid is provided with a feed port, and a feed cover is arranged on the feed port.

In this technical solution, turbulence ribs are arranged in the cup body, thus further improving the turbulence effect and the shattering effect; a cup lid is arranged on the cup body, thus preventing splashing from the cup body during the food shattering process to affect sanitation in the local environment; the cup lid is further provided with a feed port, thus facilitating feeding, avoiding frequently opening the cup lid and reducing the operating steps; and in order to prevent foreign matters from entering the cup body, a feed cover is arranged at the feed port, and the feed port is closed via the feed cover after feeding food material, thus ensuring sanitation during usage.

In the above technical solution, preferably, a cup base on which the cup body is arranged is further included, wherein the cup body is connected to the cup base via threads or clamping.

In this technical solution, the cup body is arranged on the cup base, and the cup body is connected to the cup base via threads or clamping, so that the structure is simple, assembly and disassembly are made easy, the production efficiency is improved, and the production cost is reduced.

In the above technical solution, preferably, a sealing ring is arranged between the cutter head and the cup body, and the cup body is connected to the cup base via threads to press and fix the cutter head at the bottom of the cup body.

In this technical solution, a sealing ring is arranged between the cutter head and the cup body, thus ensuring the sealing effect between the cup body and the cutter head; and furthermore, the cup body is connected to the cup base via threads to press the cutter head at the bottom of the cup body, thus facilitating fixation of the cutter head and ensuring safety during usage.

The additional aspects and advantages of the present disclosure will be made obvious in the following description or learnt via actual use of the present disclosure.

BRIEF DESCRIPTION OF THE DRAWINGS

The above-mentioned and/or additional aspects and advantages of the present disclosure will be made obvious and easily understood in the description of embodiments in combination with the following accompanying drawings, in which.

Figure 1:
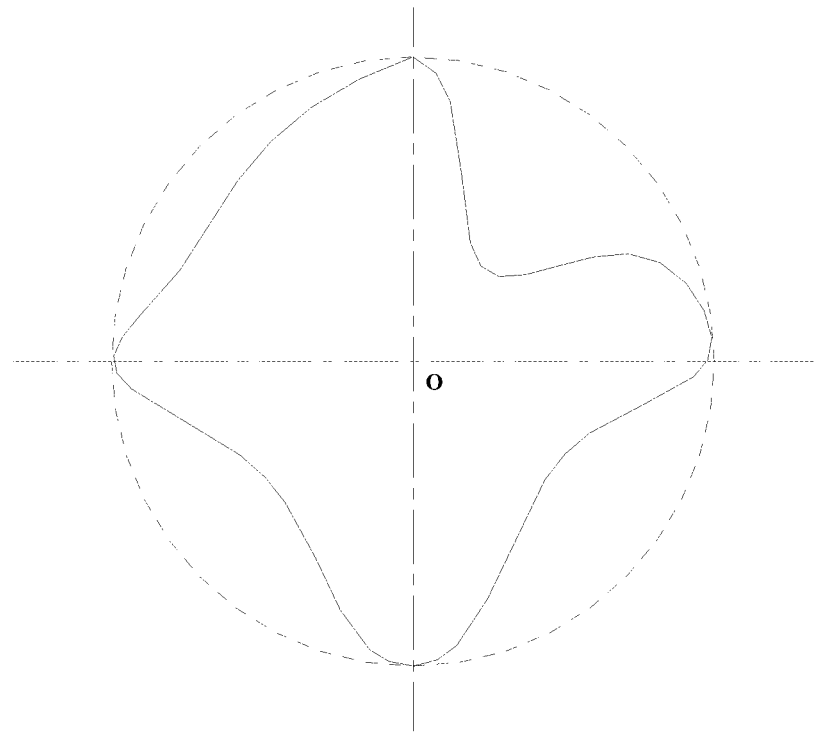
FIG. 1 shows a schematic diagram of a smallest circumscribed circle.

The corresponding relationship between reference signs in FIGS. 1-11 and component names is as follows:
1 food processor, 102 cup body, 104 cutter head, 106 cutter, 108 cup body base circle, 110 cup body contour line, 1102 outer contour line, 1104 inner contour line, 112 turbulence rib, 114 cup base, 116 cup lid, 118 feed port, 120 feed cover, 122 first group of blades, 124 second group of blades, 126 blade, 128 cup lid sealing ring, 130 stirring cup sealing ring, 132 cutter head sealing ring, 134 coupler.

DETAILED DESCRIPTION OF THE EMBODIMENTS

In order to understand the above-mentioned purposes, features and advantages of the present disclosure more clearly, the present disclosure will be further described in detail below in combination with the accompanying drawings and specific embodiments. It should be noted that the embodiments of the present application and the features in the embodiments can be combined with one another when there isn't any conflict.

Many specific details are described below for more sufficient understanding of the present disclosure. However, the present disclosure can also be implemented by adopting other embodiments different from those described herein. Therefore, the scope of protection of the present disclosure is not limited by the specific embodiments disclosed below.

Referring to FIGS. 1-11, described below is a food processor according to some embodiments of the present disclosure.

As shown in FIGS. 3 to 7, the present disclosure puts forward a food processor 1, including: a cutter head 104, wherein a cutter 106 is arranged on the cutter head 104, the intersecting line of the side wall of the cutter head 104 and the cross section of the cutter head 104 is a cutter head contour line, the largest inscribed circle or the smallest circumscribed circle of the cutter head contour line is a cutter head base circle, and the central axis of the cutter head 104 penetrates the center of the cutter head base circle; and a cup body 102, wherein the cup body 102 is located above the cutter head 104 and arranged on the cutter head 104, the intersecting line of the cup wall of the cup body 102 and the cross section of the cup wall is a cup body contour line 110, the largest inscribed circle or the smallest circumscribed circle of the cup body contour line 110 is a cup body base circle 108, and the central axis of the cup body 102 penetrates the center of the cup body base circle 108; wherein the distances between any one of different points on the same cup body contour line 110 and the center of the cup body base circle 108 are unequal; the distances between any one of different points on the same cutter head contour line and the center of the cutter head base circle are equal.

Figure 2:
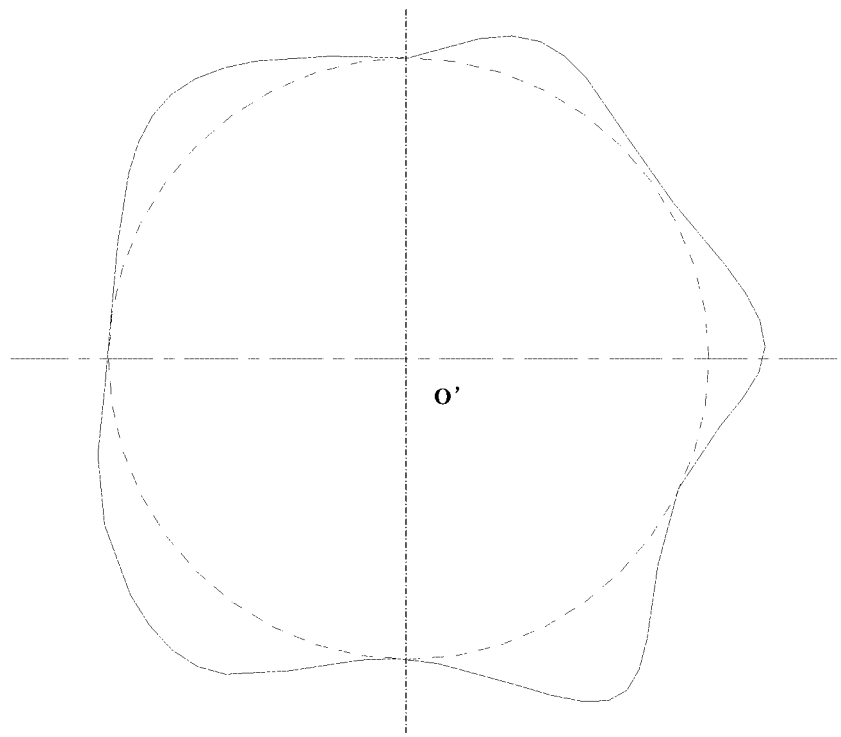
FIG. 2 shows a schematic diagram of a largest inscribed circle.
Figure 8:
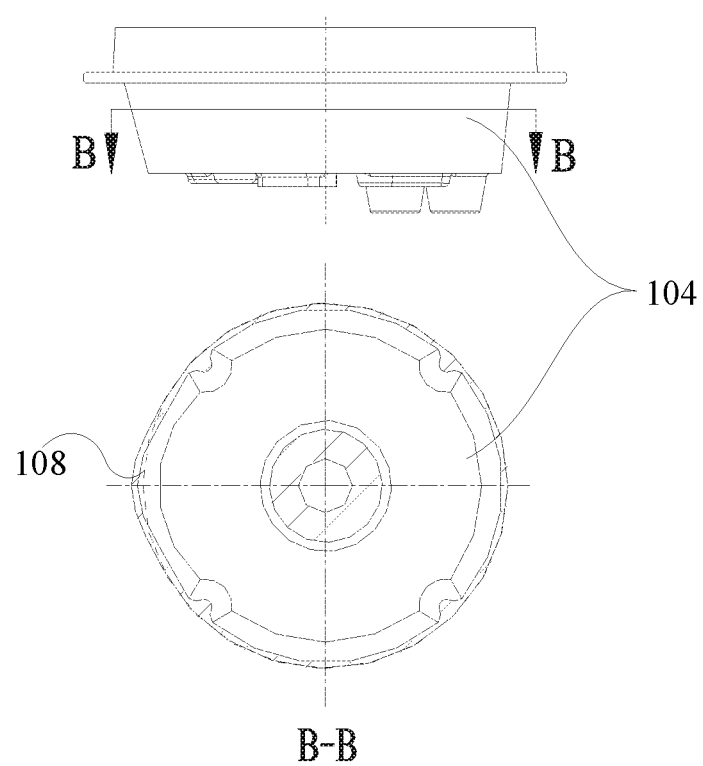
FIG. 8 shows a schematic diagram of an eccentric structure of a cutter head in one embodiment of the present disclosure.
Figure 9:
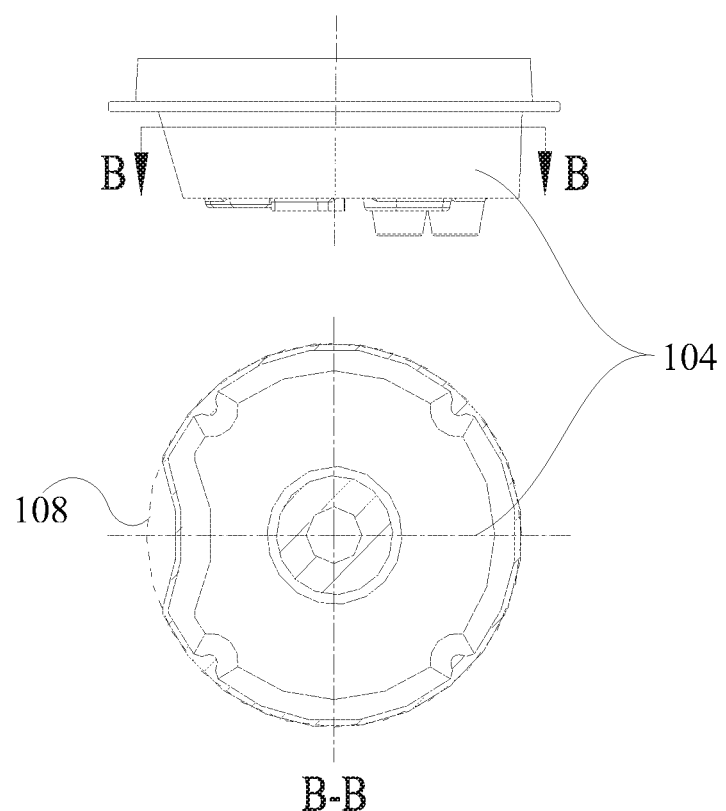
FIG. 9 shows a schematic diagram of an eccentric structure of a cutter head in another embodiment of the present disclosure.

According to the food processor 1 provided by the present disclosure, as shown in FIG. 1, the smallest circumscribed circle refers to a smallest possible circle circumscribed to the actual measured contour, and its center is O; and as shown in FIG. 2, the largest inscribed circle refers to the largest possible circle inscribed to the actual measured contour, and its center is O'. According to the food processor provided by the present disclosure, the largest inscribed circles or the smallest circumscribed circles of the cutter head contour line and the cup body contour line are respectively a cutter head base circle of the cutter head contour line, a cup body base circle of the cup body contour line, and the axis of the cutter head and the axis of the cup body respectively penetrate the center of the cutter head base circle and the center of the cup body base circle. On the one hand, the distances between different points on the same cup body contour line 110 and the center of the cup body base circle 108 are unequal, and the distances between different points on the same cutter head contour line and the center of the said cutter head base circle are equal, i.e., the cup body contour line 110 is eccentric, but the cutter head contour line is not eccentric. Adopting the eccentric cup body contour technology for stirring food can improve the whirl effect of stirring of Food Processor 1, so that the turbulence speed of food in the cup body is diversified, which can help cutter 106 shatter food better, so that the stirring performance is improved, while making taste of food great and the user experience is improved. On the other hand, the distances between any one of different points on the same cup body contour line 110 and the center of the said cup body base circle 108 are unequal, i.e., the cup body contour line 110 is eccentric; and as shown in FIGS. 8 and 9, the distances between any one of different points on the same cutter head contour line and the center of the said cutter head base circle are unequal, i.e., the cutter head contour is also eccentric. That is, the cup body contour is eccentric, and the cutter head contour is also eccentric. Adopting this eccentric technology for stirring food can improve the whirl effect of stirring of the Food Processor. Meanwhile, this structure helps the cutter shatter food better, which improves the stirring performance, making the food taste great and thereby improves the user experience. Furthermore, the relative positions of the central axis of the cup body, the central axis of the cutter head and the axis of the cutter are adjusted to realize mutual eccentricity, and the turbulence effect and the stirring performance are further improved via the eccentric technology. Furthermore, the cup body 102 of the food processor is provided with an upper opening and a lower opening, and the cross section of the cup body 102 gradually shrinks from top to bottom, i.e., the whole cup body 102 has a certain taper, and the cross section area of the upper end is greater than that of the lower end, so that on the one hand, this helps the cutter shatter food better, and on the other hand, the cup body 102 having a certain taper is beneficial to turbulence, the turbulence effect and shattering effect of food are further improved, and the taste of food is promoted.

Furthermore, in the food processor 1 provided by the present disclosure, a heating device is arranged on the cutter head 104, and the heating device includes a heating plate, a coil panel, heating coating and the like, wherein the heating plate is of a groove-type structure, the cutter 106 penetrates the said heating device and is arranged in the cutter head, the cup body 102 is located above the heating device, and both the cup body 102 and the cutter head are provided with turbulence rib 112. By combining the cup body 102 of an eccentric structure with the turbulence rib 112, the turbulence effect of stirring is improved, and this helps cutter 106 shatter food better, and then the stirring performance is improved, while making the taste of food great and the user experience is improved.

In one embodiment of the present disclosure, preferably, the central axis of the cutter head 104 coincides with that of the cup body 102.

In this embodiment, the central axes of the cutter head 104 and the cup body 102 are coincided, so that the cutter head contour is not eccentric, but the cup body 102 contour is eccentric, so that adopting the eccentric structure for stirring food can improve the whirl effect of stirring of Food Processor 1. Meanwhile, this helps cutter 106 shatter foods better, and then the stirring performance is improved, while making the taste of food great, and the user experience is improved. Furthermore, by changing the relative positions of the axis of the cutter, the central axis of the cutter head and the central axis of the cup body, the turbulence effect is improved, and the stirring performance is promoted.

Figure 3:
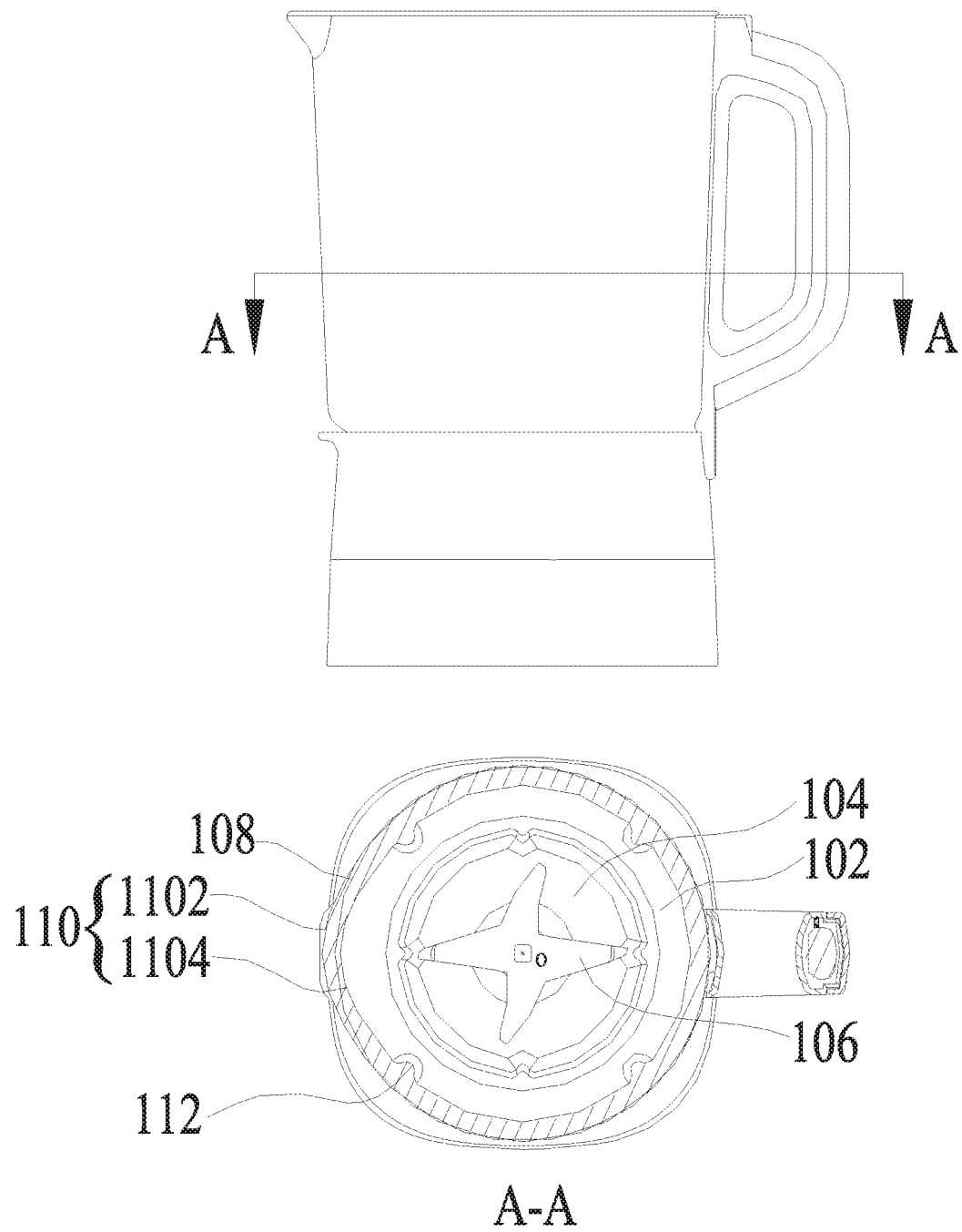
FIG. 3 shows a structural schematic diagram of a food processor in one embodiment of the present disclosure.

In one embodiment of the present disclosure, preferably, as shown in FIG. 3, the central axis of the cutter head 104 and the axis of the cutter 106 coincide with the central axis of the cup body 102.

In this embodiment, the central axis of the cup body 102 penetrating the center OC of the cup body base circle, the axis of the cutter 106 penetrating the cutter axis OK and the central axis of the cutter head 104 penetrating the center Op of the cutter head base circle are coincided, i.e., the cup body 102, the cutter head 104 and the cutter 106 are on the same central axis, thus forming an eccentric structure in which the cup body 102 contour is eccentric, whereas the cutter head 104 contour is not eccentric, and the axis of the cutter is coaxial with the axes of the cup body and the cutter head. Adopting such an eccentric structure for stirring food can improve the whirl effect of stirring of Food Processor 1, and this helps cutter 106 shatter food better, and then the stirring performance is improved, while making the taste of food great and the user experience is improved.

In one embodiment of the present disclosure, preferably, the central axis of the cutter head 104 coincides with that of the cup body 102, and has an eccentric distance of L1 away from the axis of the cutter 106.

Figure 4:
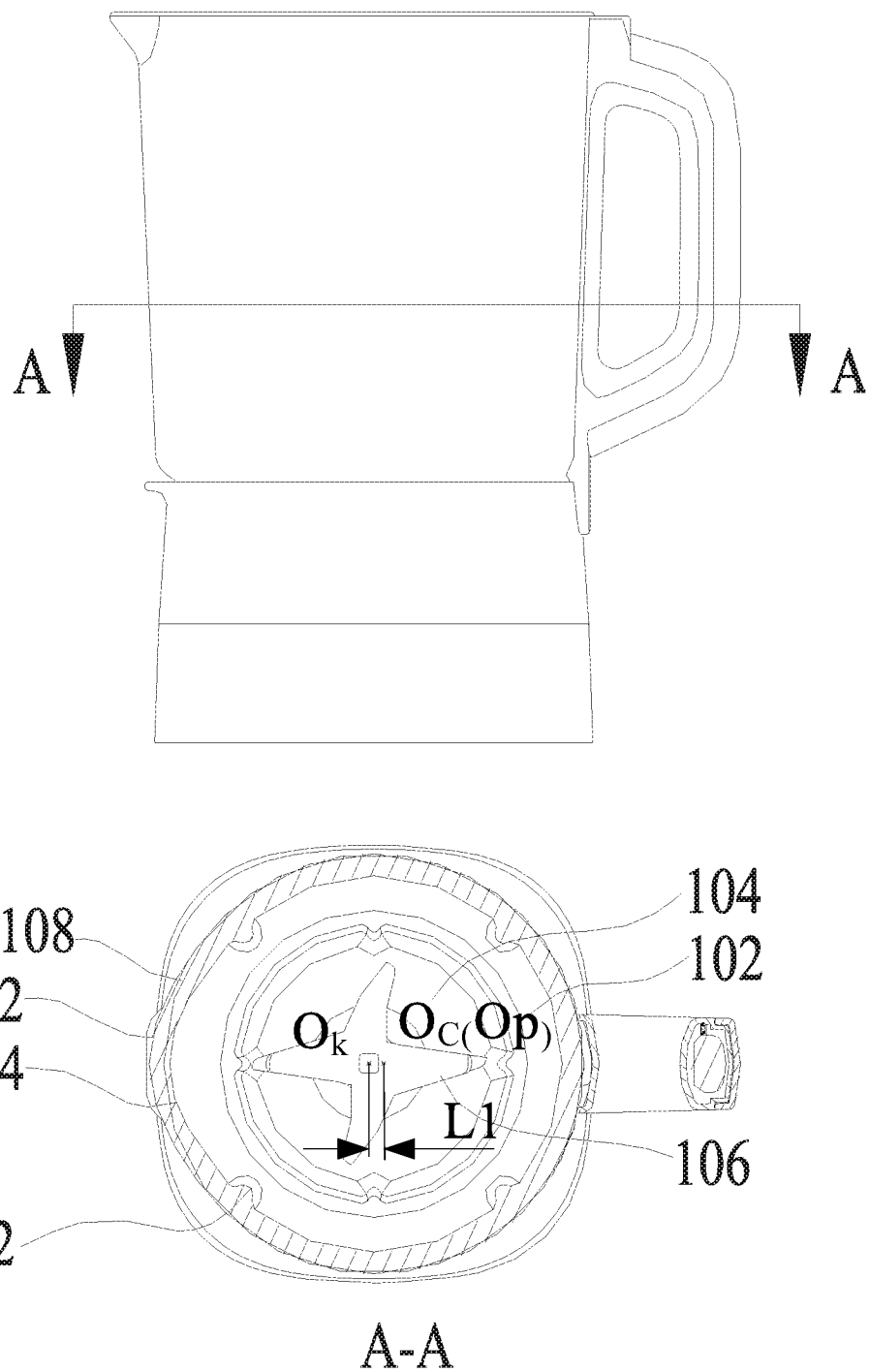
FIG. 4 shows a structural schematic diagram of a food processor in another embodiment of the present disclosure.

In this embodiment, as shown in FIG. 4, the central axis of the cutter head 104 penetrating the center Op of the cutter head base circle coincides with that of the cup body 102 penetrating the center OC of the cup body base circle, and has an eccentric distance L1 away from the axis of the cutter 106 penetrating the cutter axis OK, i.e., on the basis of the eccentric cup body contour, the axis of the cutter is eccentric relative to the central axis of the cup body and the central axis of the cutter head. By adopting the structure in which the cutter 106 is relatively eccentric and the cup body contour is eccentric, the whirl effect of stirring is improved, and this helps cutter 106 shatter food better, and then the stirring performance is improved, while making the taste of food great and the user experience is improved.

In one embodiment of the present disclosure, preferably, the central axis of the cutter head 104 does not coincide with that of the cup body 102.

In this embodiment, the central axis of the cutter head 104 does not coincide with that of the cup body 102, i.e., the axes are relatively eccentric, meanwhile, the cup body 102 contour is eccentric, so that adopting this eccentric structure for stirring food can improve the whirl effect of stirring of Food Processor 1, and this helps cutter 106 shatter food better, and then the stirring performance is improved, while making the taste of food great and the user experience is improved.

In one embodiment of the present disclosure, preferably, the central axis of the cutter head 104 and the axis of the cutter 106 are coincided, and have an eccentric distance L2 away from the central axis of the cup body 102.

Figure 5:
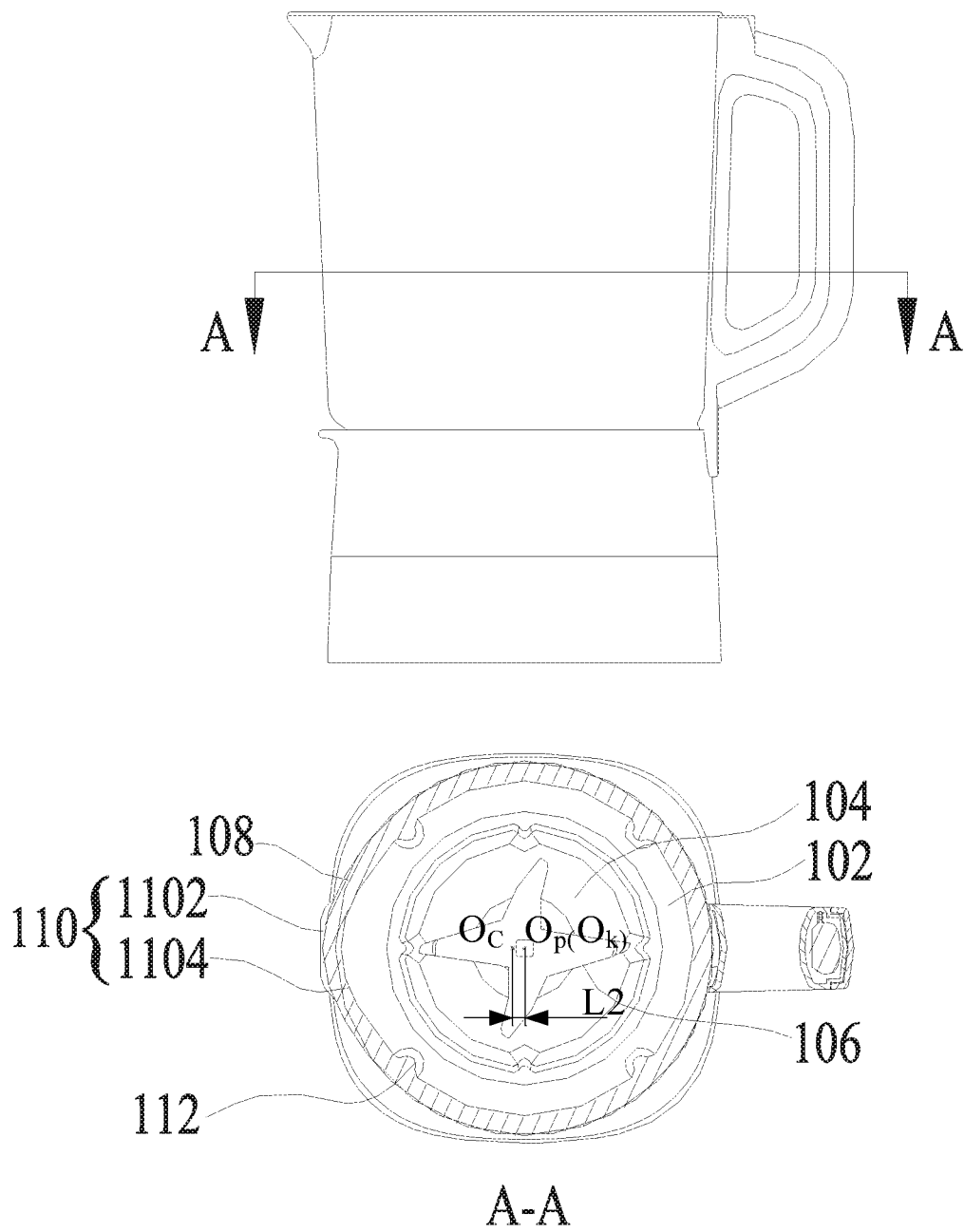
FIG. 5 shows a structural schematic diagram of a food processor in a further embodiment of the present disclosure.

In this embodiment, as shown in FIG. 5, the central axis of the cutter head 104 penetrating the center Op of the cutter head base circle and the axis of the cutter 106 penetrating through the cutter axis OK are coincided, and have an eccentric distance L2 away from the central axis of the cup body 102 penetrating the center OC of the cup body base circle, i.e., the cup body contour is eccentric, meanwhile, the central axis of the cup body has an eccentric distance L2 relative to the central axis of the cutter head 104 and the axis of the cutter 106. Through the cup body 102 adopting such an eccentric structure for stirring food, the whirl effect of stirring can be improved, and this helps cutter 106 shatter food better, and then the stirring performance is improved, while making the taste of food great and the user experience is improved.

In one embodiment of the present disclosure, preferably, the central axis of the cup body 102 coincides with the axis of the cutter 106, and has an eccentric distance L3 away from the central axis of the cutter head 104.

Figure 6:
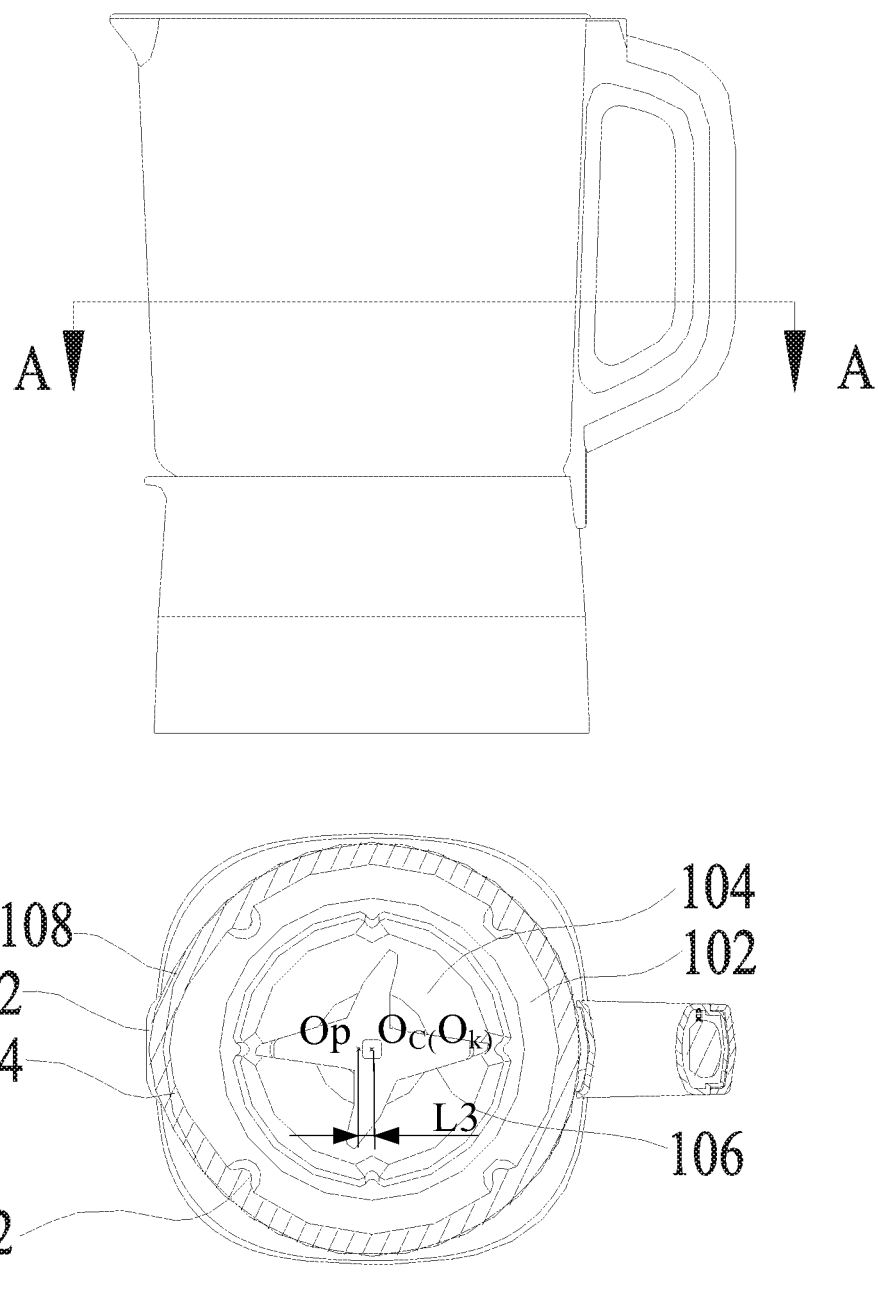
FIG. 6 shows a structural schematic diagram of a food processor in a further embodiment of the present disclosure.

In this embodiment, as shown in FIG. 6, the central axis of the cup body 102 penetrating through the center OC of the cup body base circle coincides with the axis of the cutter 106 penetrating through the cutter axis OK, and has an eccentric distance of L3 away from the central axis of the cutter head 104 penetrating through the center OP of the cutter head base circle, i.e., the cup body contour is eccentric, and the cup body 102 is coaxial with the cutter 106 and has an eccentric distance L3 away from the central axis of cutter head 104. By adopting this eccentric structure, the whirl effect of stirring is improved, and this helps cutter 106 shatter food better, and then the stirring performance is improved, while making the taste of food great and the user experience is improved.

In one embodiment of the present disclosure, preferably, the central axis of the cup body 102 and the central axis of the cutter head 104 have an eccentric distance L4; the central axis of the cutter head 104 and the axis of the cutter 106 have an eccentric distance L5; and the central axis of the cup body 102 and the axis of the cutter 106 have an eccentric distance L6.

Figure 7:
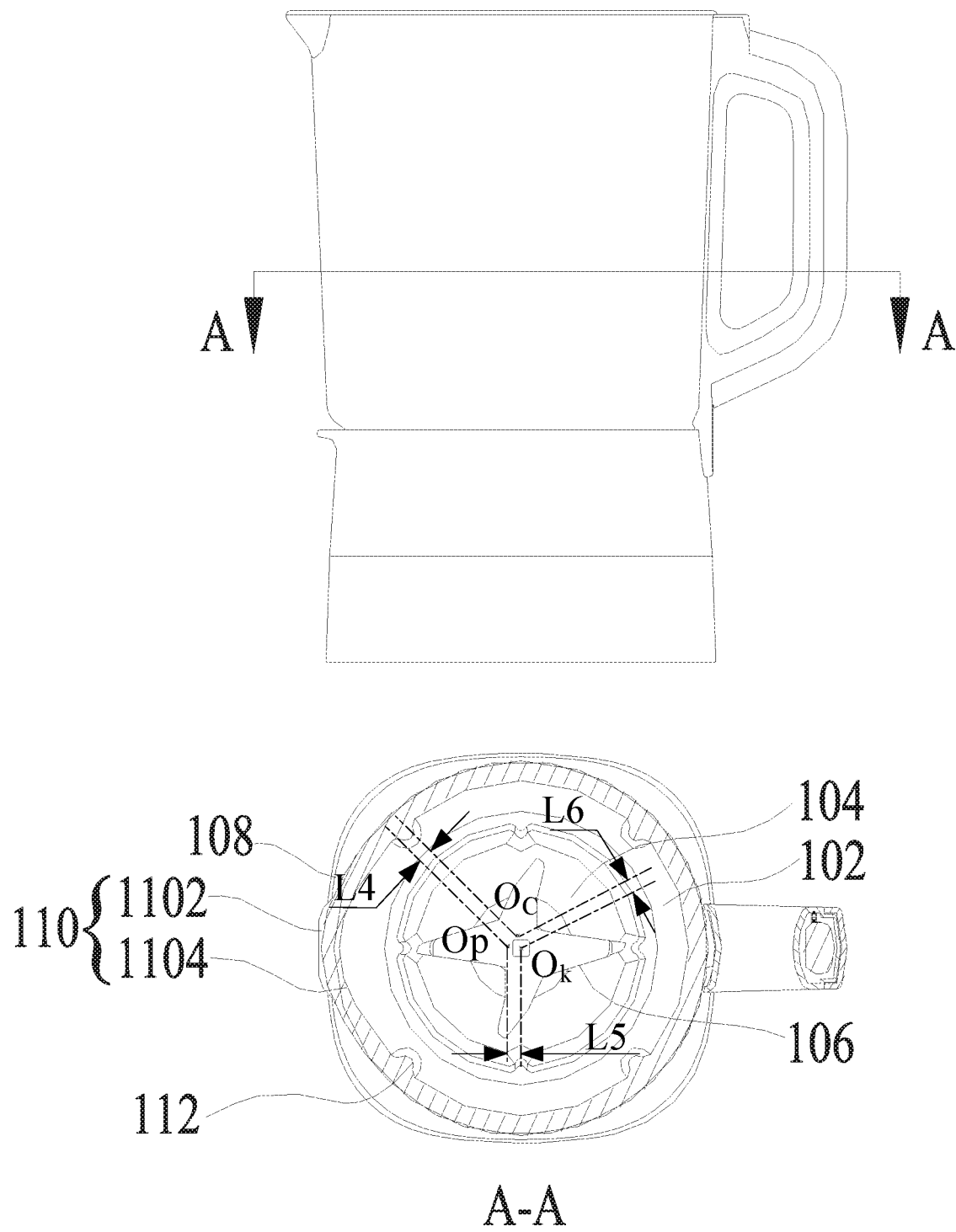
FIG. 7 shows a structural schematic diagram of a food processor in a further embodiment of the present disclosure.

In this embodiment, as shown in FIG. 7, the central axis of the cup body 102 penetrating the center OC of the cup body base circle, the axis of the cutter 106 penetrating the cutter axis OK and the central axis of the cutter head 104 penetrating the center OP of the cutter head base circle all have eccentric distances. By adopting this eccentric structure, the whirl effect of stirring is further improved, and this helps cutter 106 shatter food better, and then the stirring performance is improved, while making the taste of food great and the user experience is improved. When the central axis of the cup body, the central axis of the cutter and the central axis of the cutter head are nonlinear or unparallel, the distance between any one of central axes refers to the distance between any one of central axes and the intersecting point of any same cross section.

In one embodiment of the present disclosure, preferably, a contour eccentric distance is further included, which is an absolute value of subtracting the radius of the base circle from the distance between different points on the contour line and the center of the base circle, wherein the contour eccentric distance of the cup body 102 is L7, and the contour eccentric distance of the cutter head is L8.

In this embodiment, on the one hand, the cutter head 102 contour itself is eccentric, and the contour eccentric distance of the cup body 102 is L7; and on the other hand, the contour eccentric distance of the cup body is L7, and the contour eccentric distance of the cutter head is L8. Through the eccentric structure, the turbulence effect is improved, and then the stirring performance is promoted.

In one embodiment of the present disclosure, preferably, the eccentric distance L1, the eccentric distance L2, the eccentric distance L3, the eccentric distance L4, the eccentric distance L5 and the eccentric distance L6 are respectively more than or equal to 0 mm and less than or equal to 50 mm; and the contour eccentric distance L7 of the cup body and the contour eccentric distance L8 of the cutter head are respectively more than or equal to 0 mm and less than or equal to 100 mm.

In this embodiment, by setting reasonable eccentric distances, the optimal turbulence effect is realized, and the stirring performance is improved.

In one embodiment of the present disclosure, preferably, the cutter head 104 and the cup body 102 are of an integrated structure or a split structure.

In this embodiment, on the one hand, the cutter head 104 and the cup body 102 are of an integrated structure, so that the stability is good, the installation process is made easy, and the production efficiency is improved; and on the other hand, the cutter head 104 and the cup body 102 are of a split structure to make disassembly and maintenance easy, and in order to ensure the leak tightness of the cutter head 104 and the cup body 102, preferably, a sealing ring is arranged between the cutter head 104 and the cup body 102.

In one embodiment of the present disclosure, preferably, the cross section of the cup body 102 is a dome and/or the cross section of the cutter head 104 is a dome.

In this embodiment, on the one hand, the cross section of the cup body 102 is a dome; and on the other hand, the cross sections of both the cup body 102 and the cutter head 104 are domes, and the eccentricity is formed via irregular curves, so that the turbulence effect of the cup body 102 is improved, which also helps the cutter 106 shatter food better, and then the stirring performance is improved. Furthermore, preferably, the dome is an ellipse, in the specific embodiment, the cross section of the cup body 102 is an ellipse, the cup body 102 with such a structure is easy to process, meanwhile, the central axis of the cutter head 104, the central axis of the cutter 106 and the central axis of the cup body 102 are respectively distributed at the two focus points of the ellipse to form eccentricity, so that the structure is simple, and it is easy to operate. Moreover, the turbulence effect of the cup body 102 is further improved, which also helps the cutter 106 shatter food better, and then the stirring performance is improved. In the specific embodiment, on the one hand, the ellipse has two focus points F1 and F2, the central axis of the cutter head 104 and the central axis of the cutter 106 may be coaxially distributed at one of the two focuses F1 and F2 of the ellipse, and the central axis of the cup body 102 may be distributed at the other one of the two focuses F1 and F2 of the ellipse; on the other hand, the central axis of the cutter head 104 and the central axis of the cutter 106 are not coaxial but are respectively located at one of the two focuses F1 and F2 of the ellipse, and the central axis of the cup body 102 is coaxial with the central axis of the cutter head 104 or the central axis of the cutter 106; and on a further hand, the central axis of the cutter head 104 and the central axis of the cutter 106 are not coaxial but are respectively located at one of the two focuses F1 and F2 of the ellipse, the central axis of the cup body 102 is not coaxial with either the central axis of the cutter head 104 or the central axis of the cutter 106, and the central axis of the cup body 102 is located at a point in the ellipse other than the focuses F1 and F2. Listed above are only part of the embodiments, the protection scope of the present application is not limited thereto, and the distribution positions of the central axis of the cup body 102, the central axis of the cutter head 104 and the central axis of the cutter 106 are set according to specific circumstances and should be set in the goal of achieving the optimal effect.

In one embodiment of the present disclosure, preferably, as shown in FIG. 2, the cup wall includes the outer wall and the inner wall of the cup body 102; and the contour line of the cup body 102 is an intersecting line of the outer wall of the cup body 102 and the cross section of the outer wall of the cup body 102, or the contour line of the cup body 102 is an intersecting line of the inner wall of the cup body 102 and the cross section of the inner wall of the cup body 102.

In this embodiment, the contour line of the cup body 102 can be an intersecting line of the outer wall of the cup body 102 and the cross section of the cup wall, i.e., a cup body inner contour line 1104, or an intersecting line of the inner wall of the cup body 102 and the cross section of the cup wall, i.e., a cup body outer contour line 1102. The contour line may be obtained through multiple ways, and the distances between different points on the same contour line and the center of the base circle of the said cutter head 104 are unequal, so that an eccentric structure is formed, thereby the whirl effect is improved, and the stirring performance is promoted.

In one embodiment of the present disclosure, preferably, the cutter 106 includes at least two groups of blades, and each group of blades includes at least two blades 126, wherein the blades 126 of one group of blades extend downward obliquely, and the blades 126 of the other group of blades extend upward obliquely; or the blades 126 of one group of blades extend horizontally, and the blades 126 of the other group of blades extend upward or downward obliquely.

In this embodiment, multiple groups of blades are provided, and the extending angle of each group of blades is different, so that the turbulence effect of the cup body is further improved, the contact area between the cutter 106 and food is increased to realize repeated shattering of the food. Thereby, the food is crushed more thoroughly, the taste of the food is promoted, and user's satisfaction is improved.

In one embodiment of the present disclosure, preferably, the cutter 106 includes two groups of blades, which are respectively a first group of blades 122 and a second group of blades 124, and each group of blades is composed of two blades 126; the blade 126 of the first group of blades 122 includes an oblique part and a horizontal part, the oblique part is close to the central axis of the cutter head, and the horizontal part is away from the central axis of the cutter head; wherein the blades 126 of the first group of blades 122 extend downward obliquely and are arranged below the second group of blades 124, and the blades 126 of the second group of blades 124 extend upward obliquely.

In this embodiment, two groups of blades are provided, wherein the first group of blades 122 is arranged above the second group of blades 124, the blades 126 of the first group of blades 122 extend downward, while the blades 126 of the second group of blades 124 extend upward, i.e., the extending directions are opposite; through setting the blades on the upper two sides, the contact area of the cutter 106 and food is increased sufficiently, and the shattering efficiency is improved; and the extending directions of the blades 126 are set in opposite directions, so that the turbulence effect and the shattering effect at different heights are further improved, the overall food shattering efficiency is improved, the shattering effect is also improved, and the taste of food and the user experience are promoted.

In one embodiment of the present disclosure, preferably, the first group of blades 122 and the second group of blades 124 are of an integrated structure.

In this embodiment, the two groups of blades are of an integrated structure, so that the overall strength of the cutter 106 is improved, the service reliability of the cutter 106 is guaranteed, and the service life of the cutter 106 is prolonged; Furthermore, the integrated structure of cutter 106 makes maintenance and installation easy, and improves the production efficiency.

In one embodiment of the present disclosure, preferably, turbulence ribs 112 are arranged in the cup body 102, a cup lid 116 is arranged on the cup body 102, the cup lid 116 is provided with a feed port 118, and a feed cover 120 is arranged on the feed port 118.

In this embodiment, turbulence ribs 112 are arranged in the cup body 102, thus further improving the turbulence effect and the shattering effect; a cup lid 116 is arranged on the cup body 102, thus preventing splashing from the cup body 102 to happen in the food shattering process which may affect the sanitation in the local environment; the cup lid 116 is further provided with a feed port 118, thus making feeding easy, avoiding frequently opening the cup lid 116 and reducing the operating steps; and in order to prevent foreign matters from entering the cup body 102, a feed cover 120 is arranged at the feed port 118, and the feed port 118 is closed via the feed cover 120 after feeding, thus ensuring the sanitation during usage.

In one embodiment of the present disclosure, preferably, a cup base 114 on which the cup body 102 is arranged is further included, wherein the cup body 102 is connected to the cup base 114 via threads or clamping.

In this embodiment, the cup body 102 is arranged on the cup base 114, and the cup body 102 is connected to the cup base 114 via threads or clamping, so that the structure is simple, assembly and disassembly are made easy, the production efficiency is improved, and the production cost is reduced.

In one embodiment of the present disclosure, preferably, a sealing ring is arranged between the cutter head 104 and the cup body 102, and the cup body 102 is connected to the cup base 114 via threads to press and fix the cutter head to the bottom of the cup body 102.

In this embodiment, a sealing ring is arranged between the cutter head 104 and the cup body 102, thus ensuring the sealing effect between the cup body 102 and the cutter head 104; and furthermore, the cup body 102 is connected to the cup base 114 via threads to press the cutter head 104 to the bottom of the cup body 102, thus helps to ensure the fixation of the cutter head 104 and to ensure safety during usage.

In one embodiment of the present disclosure, preferably, the food processor includes a blender, a high speed blender and a juicer.

In this embodiment, the food processor with an eccentric stirring function includes a blender, a high speed blender, a juicer, a soybean milk maker or the like. Through the eccentric setting, the whirl effect is improved, and the stirring performance is promoted, so that the taste of food is great and the user experience is improved.

Figure 10:
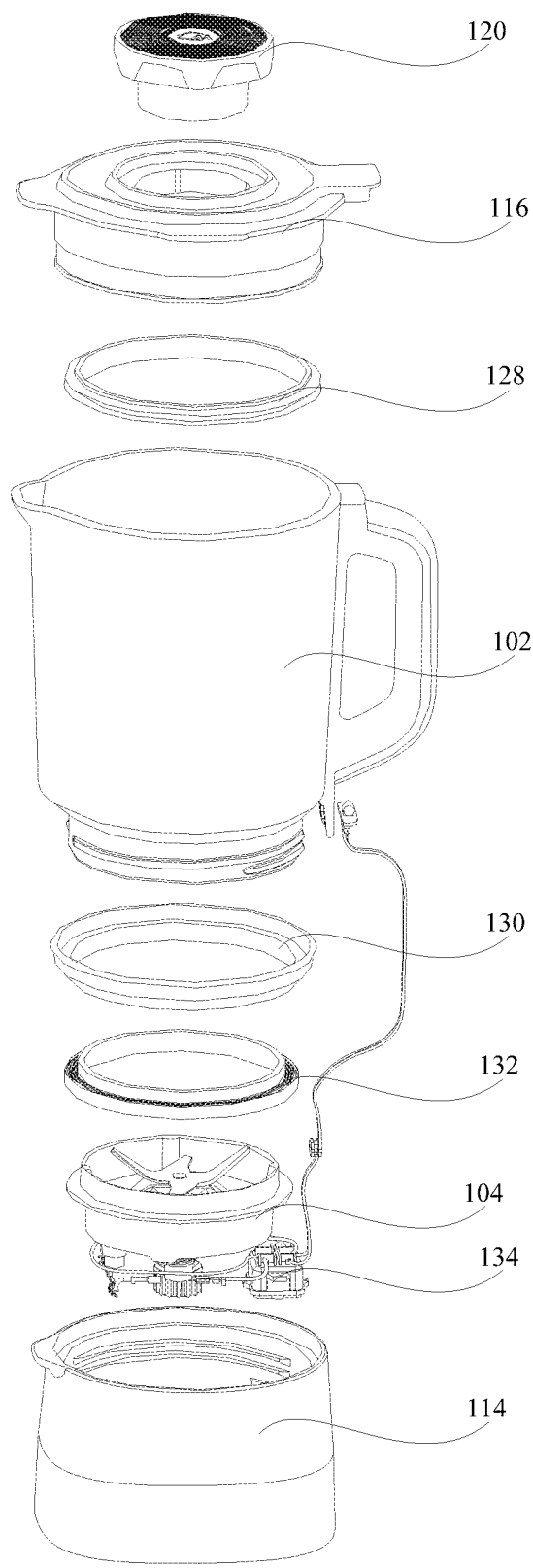
FIG. 10 shows a broken down structural schematic diagram of a food processor in one embodiment of the present disclosure.
Figure 11:
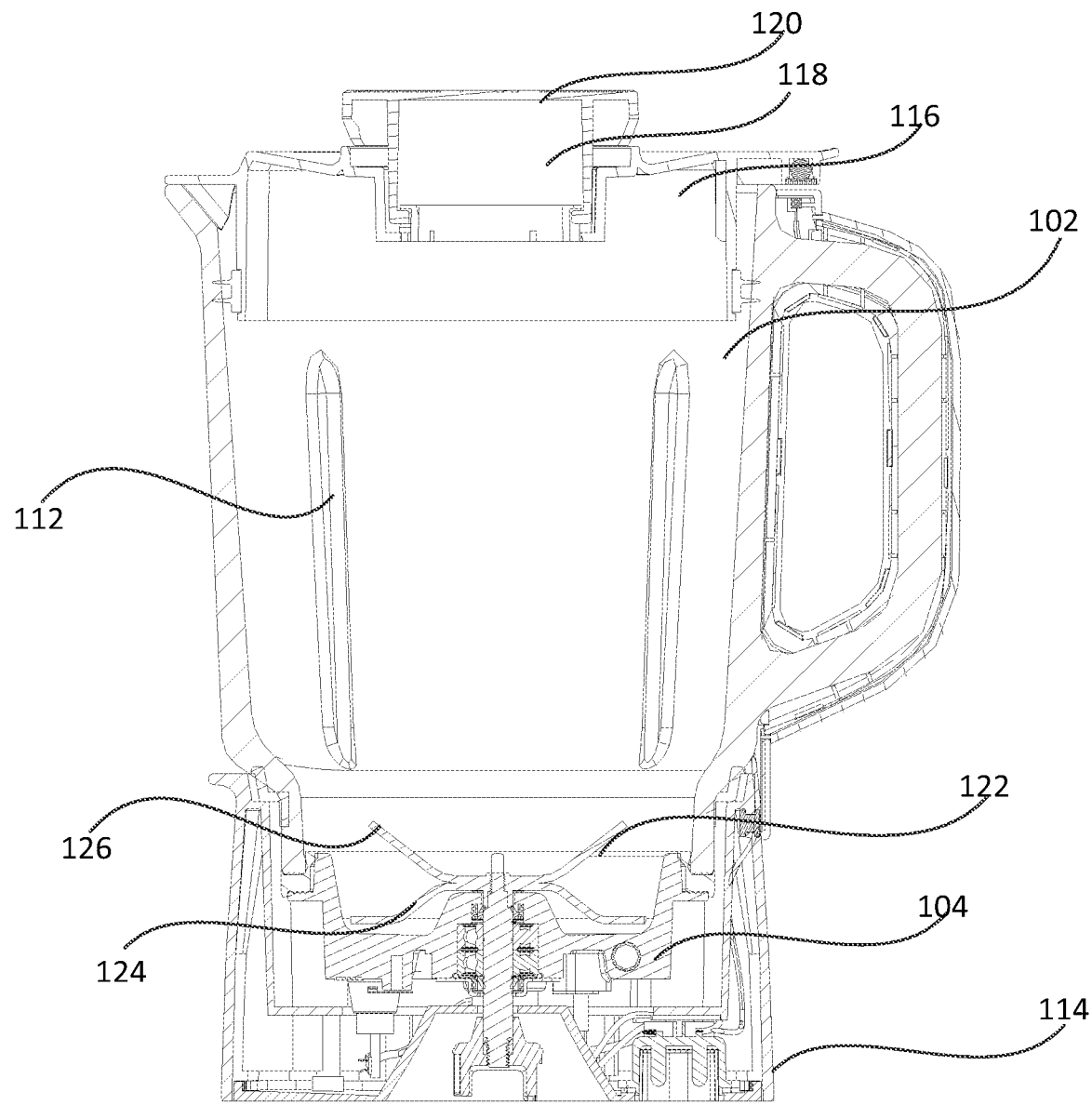
FIG. 11 shows a structural schematic diagram of the food processor in the embodiment shown by FIG. 10 after assembly.

As shown in FIGS. 10 and 11, the blender in a specific embodiment of the food processor provided by the present disclosure mainly includes a cup body assembly, a stirring cutter assembly 106, a cutter head 104 and a stirring cup base 114, wherein the stirring cutter assembly is arranged on the cutter head 104, the cup body assembly is connected to the cutter head 106, and a coupler 134 is arranged on the stirring cup base 114. The cup body assembly includes a stirring cup 102 and a cup lid 116 on the stirring cup, the cup lid 116 with a feed port 118, a feed cover 120 with the feed port 118, and a cup lid sealing ring 128 which is arranged between the cup lid 116 and the stirring cup 102; and when the stirring cup 102 and the cutter head 104 are of a split structure, a stirring cup sealing ring 130 and a cutter head sealing ring 132 are arranged between the stirring cup 102 and the cutter head 104. By adopting the structure in which the cup body is eccentric or the axes of the cup body, the cutter head and the cutter are relatively eccentric, the turbulence effect during food stirring can be effectively improved, the taste of food is promoted, and the user's satisfaction is improved.

In the present disclosure, the term "multiple" refers to two or more, unless otherwise specified. The terms "mounted", "connected", "fixed" and the like should be understood in the general term of the words, e.g., "connected" may mean fixedly connected, detachably connected or integrally connected; and "connected" may be directly connected or indirectly connected via a medium. For those normal technical staff in this technical area, the specific meanings of said terms in the present disclosure can be understood according to specific circumstances.

In the description of this description section, the terms "one embodiment", "some embodiments", "specific embodiment" and the like imply that the specific features, structures, materials or characteristics described in combination with the embodiment or example are included in at least one embodiment or example of the present disclosure. In this specification, the schematic expressions of said terms do not necessarily refer to the same embodiments or examples. Furthermore, the described specific features, structures, materials or characteristics can be combined into any one or more of the embodiments or examples by appropriate ways.

Described above are merely preferred embodiments of the present disclosure, and the present disclosure is not limited thereto. Various modifications and changes may be made to the present disclosure for those skilled in the art. Any modification, equivalent substitution, improvement and the like made within the spirit and principle of the present disclosure shall fall into the protection scope of the present disclosure.

What is claimed is:

1. A food processor, comprising:
   a cutter head, on which a cutter is arranged, wherein the intersecting line of the side wall of the cutter head and the cross section of the cutter head is a cutter head contour line, the largest inscribed circle or the smallest circumscribed circle of the cutter head contour line is a cutter head base circle, and the central axis of the cutter head passes through the center of the cutter head base circle; and a cup body, wherein the cup body is located above the cutter head and arranged on the cutter head, the intersecting line of the cup wall of the cup body and the cross section of the cup wall is a cup body contour line, the largest inscribed circle or the smallest circumscribed circle of the cup body contour line is a cup body base circle, and the central axis of the cup body passes through the center of the cup body base circle, wherein the distances between any one of different points on the same cup body contour line and the center of the cup body base circle are unequal; and the distances between any one of different points on the same cutter head contour line and the center of the cutter head base circle are either equal or unequal.

2. The food processor of claim 1, wherein:
the central axis of the cutter head coincides with that of the cup body.

3. The food processor of claim 2, wherein:
the central axis of the cutter head and the axis of the cutter coincides with the central axis of the cup body.

4. The food processor of claim 2, wherein:
the central axis of the cutter head coincides with that of the cup body, and has an eccentric distance L1 from the axis of the cutter; and the eccentric distance L1 is more than or equal to 0 mm and less than or equal to 50 mm.

5. The food processor of claim 1, wherein:
the central axis of the cutter head does not coincide with that of the cup body, and has an eccentric distance L1 from the axis of the cutter; and the eccentric distance L1 is more than or equal to 0 mm and less than or equal to 50 mm.

6. The food processor of claim 5, wherein:
the central axis of the cutter head coincides with the axis of the cutter, and has an eccentric distance L2 from the central axis of the cup body.

7. The food processor of claim 5, wherein:
the central axis of the cup body coincides with the axis of the cutter, and has an eccentric distance L3 from the central axis of the cutter head.

8. The food processor of claim 5, wherein:
the central axis of the cup body has an eccentric distance L4 from the central axis of the cutter head;
the central axis of the cutter head has an eccentric distance L5 from the axis of the cutter;
the central axis of the cup body has an eccentric distance L6 from the axis of the cutter; and
the eccentric distance L4, the eccentric distance L5 and the eccentric distance L6 are more than or equal to 0 mm and less than or equal to 50 mm, respectively.

9. The food processor of claim 8, further comprising:
a contour eccentric distance, which is an absolute value of a value obtained by subtracting the radius of the base circle from the distance between different points on the contour lines and the center of the base circle,
wherein a contour eccentric distance of the cup body L7 is an absolute value of a value obtained by subtracting the radius of the base circle of the cup body from the distance between different points on the contour lines of the cup body and the center of the base circle of cup body, and a contour eccentric distance of the cutter head L8 is an absolute value of a value obtained by subtracting the radius of the base circle of the cutter head from the distance between different points on the contour lines of the cutter head and the center of the base circle of the cutter head, and the eccentric distance L4, the eccentric distance L5 and the eccentric distance L6 are more than or equal to 0 mm and less than or equal to 50 mm, respectively.

10. The food processor of claim 1, wherein the cutter head and the cup body are of an integrated structure or a split structure.

11. The food processor of claim 1, wherein:
the cross section of the cup body is a dome and/or the cross section of the cutter head is a dome.

12. The food processor of claim 1, wherein:
the cup wall comprises an outer wall and an inner wall of the cup body; and
the contour line of the cup body is an intersecting line of the outer wall of the cup body and the cross section of the outer wall of the cup body.

13. The food processor of claim 1, wherein:
the cup wall comprises an outer wall and an inner wall of the cup body; and
the contour line of the cup body is an intersecting line of the inner wall of the cup body and the cross section of the inner wall of the cup body.

14. The food processor of claim 1, wherein:
the cutter comprises at least two groups of blades, and each group of blades comprises at least two blades; and
the blades of one group of blades extend horizontally, and the blades of the other group of blades extend upward or downward obliquely.

15. The food processor of claim 1, wherein:
the cutter comprises at least two groups of blades, and each group of blades comprises at least two blades; and
the blades of one group of blades extend downward obliquely, and the blades of the other group of blades extend upward obliquely.

16. The food processor of claim 1, wherein:
the cutter comprises two groups of blades, which are a first group of blades and a second group of blades respectively, each of which is composed of two blades;
the blades of the first group of blades comprises an oblique part and a horizontal part, the oblique part is close to the central axis of the cutter head, and the horizontal part is away from the central axis of the cutter head; and
the blades of the first group of blades extend downward obliquely and are arranged below the second group of blades, and the blades of the second group of blades extend upward obliquely.

17. The food processor of claim 16, wherein:
the first group of blades and the second group of blades are of an integrated structure.

18. The food processor of claim 1, wherein:
turbulent ribs are arranged in the cup body, a cup lid is arranged on the cup body, a feed port is provided on the cup lid, and a feed cover is arranged on the feed port.

19. The food processor of claim 1, further comprising:
a cup base, on which the cup body is arranged, wherein the cup body is connected to the cup base via threads or is clamped to the cup base.

20. The food processor of claim 19, wherein:
a sealing ring is arranged between the cutter head and the cup body, and the cup body is connected to the cup base via threads to press and fix the cutter head against the bottom of the cup body.

* * * * *